United States Patent
Achiwa et al.

(10) Patent No.: US 9,692,923 B2
(45) Date of Patent: Jun. 27, 2017

(54) INFORMATION PROCESSING APPARATUS CAPABLE OF SUPPLYING POWER TO EXTERNAL DEVICE, PRINTING APPARATUS, METHOD OF CONTROLLING INFORMATION PROCESSING APPARATUS, METHOD OF CONTROLLING PRINTING APPARATUS, AND STORAGE MEDIUM

(71) Applicant: CANON KABUSHIKI KAISHA, Tokyo (JP)

(72) Inventors: Ken Achiwa, Kawasaki (JP); Tomohiro Tachikawa, Tokyo (JP); Naotsugu Itoh, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/637,458

(22) Filed: Mar. 4, 2015

(65) Prior Publication Data

US 2015/0264208 A1    Sep. 17, 2015

(30) Foreign Application Priority Data

Mar. 17, 2014 (JP) ................................ 2014-053480

(51) Int. Cl.
*H04N 1/00* (2006.01)
*G06F 1/26* (2006.01)
*G06F 3/12* (2006.01)
*G06K 15/02* (2006.01)

(52) U.S. Cl.
CPC ......... *H04N 1/00885* (2013.01); *G06F 1/266* (2013.01); *H04N 2201/001* (2013.01); *H04N 2201/0048* (2013.01); *H04N 2201/0094* (2013.01)

(58) Field of Classification Search
None
See application file for complete search history.

(56) References Cited

U.S. PATENT DOCUMENTS

| 6,526,516 | B1* | 2/2003 | Ishikawa | G06F 1/189 |
| | | | | 348/207.2 |
| 7,619,759 | B1* | 11/2009 | Mishima | B41J 29/38 |
| | | | | 358/1.14 |
| 2003/0221134 | A1* | 11/2003 | Ebato | G06F 1/3203 |
| | | | | 713/300 |
| 2004/0187042 | A1* | 9/2004 | Kawanabe | G06F 1/266 |
| | | | | 713/300 |
| 2004/0246509 | A1 | 12/2004 | Hongo et al. | |

(Continued)

FOREIGN PATENT DOCUMENTS

JP    2005-074945 A    3/2005

*Primary Examiner* — Beniyam Menberu
(74) *Attorney, Agent, or Firm* — Rossi, Kimms & McDowell LLP

(57) ABSTRACT

An information processing apparatus that achieves both power supply to an external device and information processing. Power supply capability to be presented to the external device is determined based on a state of the information processing apparatus. Power is supplied to the external device, based on a request from the external device as to the power supply capability to be presented to the external device. In a case where the state of the information processing apparatus has changed, the power supply capability to be presented to the external device is changed based on the changed state.

5 Claims, 13 Drawing Sheets

(56) References Cited

U.S. PATENT DOCUMENTS

| | | | | |
|---|---|---|---|---|
| 2010/0115150 A1* | 5/2010 | Hachiya | ............ | G06F 1/266 710/19 |
| 2010/0306565 A1* | 12/2010 | Umedu | ............ | G06F 1/266 713/324 |
| 2011/0264942 A1* | 10/2011 | Tsukamoto | ............ | G06F 1/266 713/324 |
| 2012/0200157 A1* | 8/2012 | Ohi | ............ | H02J 3/32 307/23 |
| 2012/0311220 A1* | 12/2012 | Goldenberg | ............ | G06F 13/387 710/313 |
| 2012/0331312 A1* | 12/2012 | Lu | ............ | H02J 7/0004 713/300 |
| 2014/0136863 A1* | 5/2014 | Fritchman | ............ | G06F 1/26 713/310 |
| 2015/0046727 A1* | 2/2015 | Kobayashi | ............ | G06F 1/266 713/300 |

\* cited by examiner

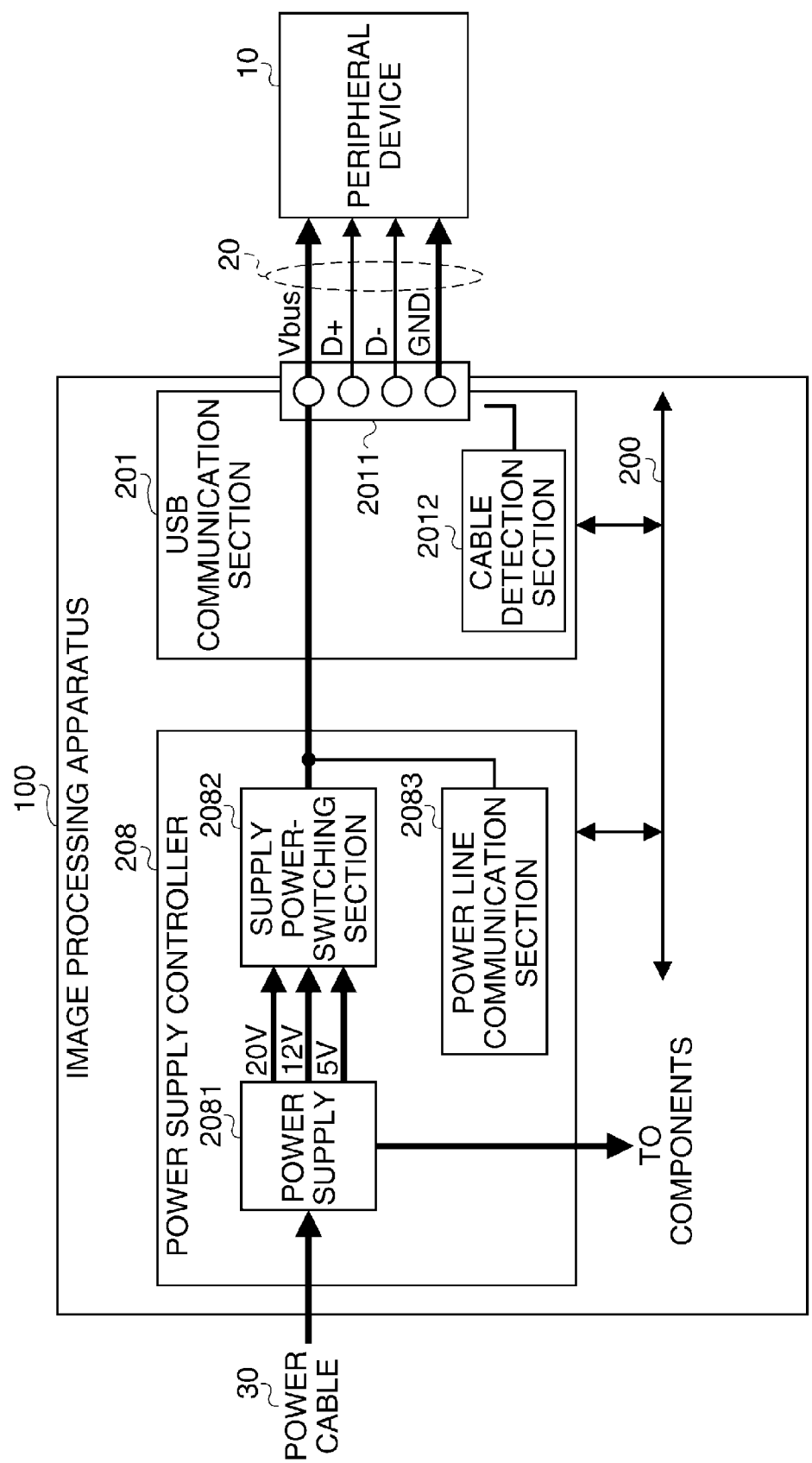

FIG. 4A

| POWER SUPPLY CAPACITY | 1300 [W] | ~300 |

FIG. 4B

APPARATUS STATE-SPECIFIC POWER TABLE ~310

| APPARATUS STATE | POWER CONSUMPTION |
|---|---|
| COPY | 1292 [W] |
| PRINT | 1268 [W] |
| SCAN | 200 [W] |
| STANDBY | 100 [W] |
| SLEEP | 5 [W] |

FIG. 4C

POWER SUPPLY CAPABILITY LIST ~320

| | SUPPLY VOLTAGE | SUPPLY CURRENT | SUPPLY POWER |
|---|---|---|---|
| 1 | 20V | 5.0A | 100 [W] |
| 2 | 20V | 3.0A | 60 [W] |
| 3 | 12V | 3.0A | 36 [W] |
| 4 | 12V | 1.5A | 18 [W] |
| 5 | 5V | 2.0A | 10 [W] |
| 6 | 5V | 1.5A | 7.5 [W] |
| 7 | 5V | 0.9A | 4.5 [W] |
| 8 | 5V | 0.5A | 2.5 [W] |

FIG. 5A

| MAXIMUM POWER SUPPLY CAPACITY | 32 [W] | ⌐400 |

FIG. 5B

POWER SUPPLY CAPABILITY TABLE

| SUPPLY VOLTAGE | SUPPLY CURRENT |
|---|---|
| 12V | 1.5A |
| 5V | 2.0A |
| 5V | 1.5A |
| 5V | 0.9A |
| 5V | 0.5A |

| | | DIRECTION | CONTENTS |
|---|---|---|---|
| 1 | POWER CONTROL NOTIFICATION (MESSAGE) | | |
| | POWER SUPPLY CAPABILITY NOTIFICATION (Capability) | IMAGE PROCESSING APPARATUS → PERIPHERAL DEVICE | INFORMATION OF A PLURALITY OF COMBINATIONS OF VOLTAGE & CURRENT WHICH CAN BE SUPPLIED |
| 2 | POWER SUPPLY REQUEST NOTIFICATION (Request) | PERIPHERAL DEVICE → IMAGE PROCESSING APPARATUS | INCLUDING AT LEAST FOLLOWING THREE INFORMATION ITEMS: VOLTAGE & CURRENT: INFORMATION INDICATIVE OF COMBINATION OF VOLTAGE & CURRENT INCLUDED IN RECEIVED POWER SUPPLY CAPABILITY NOTIFICATION Mismatch FLAG: FLAG INDICATIVE OF WHETHER OR NOT MISMATCH OF POWER SUPPLY REQUEST WITH POWER SUPPLY CAPABILITY NOTIFICATION OCCURS (IF MISMATCH OCCURS, FLAG IS SET TO ON) (IF NO MISMATCH OCCURS, FLAG IS SET TO OFF) GiveBack ATTRIBUTE FLAG: FLAG INDICATIVE OF WHETHER OR NOT SUPPLY POWER CAN BE CHANGED SO AS TO MINIMIZE POWER SUPPLY AFTER START OF POWER SUPPLY (IF SUPPLY POWER CAN BE CHANGED, FLAG IS SET TO ON) (IF SUPPLY POWER CANNOT BE CHANGED, FLAG IS SET TO OFF) |
| 3 | POWER SUPPLY ACCEPTANCE (Accept) | IMAGE PROCESSING APPARATUS → PERIPHERAL DEVICE | NOTIFICATION INDICATING THAT POWER SUPPLY ACCORDING TO POWER SUPPLY REQUEST NOTIFICATION CAN BE EXECUTED |
| 4 | POWER SUPPLY PREPARATION COMPLETION (PS_RDY) | IMAGE PROCESSING APPARATUS → PERIPHERAL DEVICE | NOTIFICATION INDICATING THAT POWER SUPPLY ACCORDING TO POWER SUPPLY REQUEST NOTIFICATION IS READY TO BE STARTED |
| 5 | POWER SUPPLY REJECTION (Reject) | IMAGE PROCESSING APPARATUS → PERIPHERAL DEVICE | NOTIFICATION INDICATIVE THAT POWER SUPPLY ACCORDING TO POWER SUPPLY REQUEST NOTIFICATION CANNOT BE EXECUTED |
| 6 | POWER SUPPLY MINIMIZATION REQUEST (GoToMin) | IMAGE PROCESSING APPARATUS → PERIPHERAL DEVICE | NOTIFICATION INDICATIVE OF REQUEST FOR CHANGING SUPPLY POWER SO AS TO MINIMIZE POWER SUPPLY ACCORDING TO POWER SUPPLY REQUEST NOTIFICATION |
| 7 | POWER SUPPLY STOPPING REQUEST (HardReset) | PERIPHERAL DEVICE → IMAGE PROCESSING APPARATUS | NOTIFICATION INDICATING THAT POWER SUPPLY ACCORDING TO POWER SUPPLY REQUEST NOTIFICATION IS REQUESTED TO BE STOPPED |

US 9,692,923 B2

INFORMATION PROCESSING APPARATUS CAPABLE OF SUPPLYING POWER TO EXTERNAL DEVICE, PRINTING APPARATUS, METHOD OF CONTROLLING INFORMATION PROCESSING APPARATUS, METHOD OF CONTROLLING PRINTING APPARATUS, AND STORAGE MEDIUM

BACKGROUND OF THE INVENTION

Field of the Invention

The present invention relates to an information processing apparatus that is capable of supplying power to an external device, a printing apparatus, a method of controlling the information processing apparatus, a method of controlling the printing apparatus, and a storage medium.

Description of the Related Art

Conventionally, as an interface for supplying power from an image processing apparatus to an external peripheral device, a USB (Universal Serial Interface) interface using USB cable connection using a Vbus power line (hereinafter simply referred to as "Vbus") has come into widespread use.

The USB standard specifies power which can be supplied to one peripheral device as a rated voltage of 5 V, a maximum current of 500 mA, and a power consumption of 2.5 W (USB 2.0), or a rated voltage of 5 V, a maximum current of 900 mA, and a power consumption of 4.5 W (USB 3.0).

In recent years, the USB standard is extended, and the USB PD (USB Power Delivery) standard that specifies power which can be supplied up to a maximum power consumption of 100 W is designed. The USB PD standard specifies a negotiation method for notifying a peripheral device of suppliable power or specifying power to be supplied, by communication with the peripheral device via the Vbus.

An easiest method for supplying power from an image processing apparatus to a peripheral device in a manner conformant to the USB PD standard is to increase a power supply capacity of the image processing apparatus to thereby ensure a capacity sufficient to achieve both image processing and power supply.

If this method is employed, power of 100 W at maximum per one peripheral device is supplied according to the USB PD standard. Therefore, a simple increase in the power supply capacity of the image processing apparatus results in a significant increase in the costs of the image processing apparatus and an increase in the whole size of the same.

To prevent increases in the costs and size, it is necessary to achieve not only image processing but also power supply to a peripheral device, with a limited power supply capacity. To this end, when supplying power from an image processing apparatus to a peripheral device, there has been proposed a technique of limiting the number of recording elements for image processing to thereby ensure power to be supplied to the peripheral device (see e.g. Japanese Patent Laid-Open Publication No. 2005-74945).

However, the technique disclosed in Japanese Patent Laid-Open Publication No. 2005-74945 is a technique that is effective for an inkjet image processing apparatus, and in a case where a plurality of recording elements are not used for recording, such as an electrophotographic image processing apparatus, it is impossible to ensure the power to be supplied by limiting the number of recording elements.

Further, power which can be supplied by an image processing apparatus largely changes depending on conditions of the image processing apparatus, such as a standby state, operating states including printing and scanning, and error states including a paper-out condition and a toner-out condition.

As described above, suppliable power from the image processing apparatus is not uniform depending on the states thereof, and hence there is a problem that suppliable power compliant with the USB PD standard cannot be unconditionally notified.

SUMMARY OF THE INVENTION

The present invention provides an information processing apparatus and a printing apparatus that achieve both power supply to an external device and information processing, a method of controlling the information processing apparatus, a method of controlling the printing apparatus, and a storage medium.

In a first aspect of the present invention, there is provided an information processing apparatus that is capable of supplying power to an external device, comprising a determination unit configured to determine power supply capability to be presented to the external device, based on a state of the information processing apparatus, a presentation unit configured to present the power supply capability determined by the determination unit to the external device, and a power supply unit configured to supply power to the external device, based on a request from the external device as to the power supply capability presented by the presentation unit, wherein in a case where the state of the information processing apparatus has changed, the determination unit changes the power supply capability to be presented to the external device, based on the changed state.

In a second aspect of the present invention, there is provided a printing apparatus that is capable of supplying power to an external device, comprising a determination unit configured to determine power supply capability to be presented to the external device, based on a state of the printing apparatus, a presentation unit configured to present the power supply capability determined by the determination unit to the external device, and a power supply unit configured to supply power to the external device, based on a request from the external device as to the power supply capability presented by the presentation unit, wherein in a case where the state of the printing apparatus has changed, the determination unit changes the power supply capability to be presented to the external device, based on the changed state.

In a third aspect of the present invention, there is provided a printing apparatus that is capable of supplying power to an external device, comprising a printing unit, a power supply unit configured to supply power to the external device, and a reception unit configured to receive a print instruction, wherein in a case where the reception unit receives the print instruction, the power supply unit reduces power supplied to the external device, and wherein after the power supply unit reduces the power supplied to the external device, the printing unit executes printing based on the print instruction.

In a fourth aspect of the present invention, there is provided a method of controlling an information processing apparatus that is capable of supplying power to an external device, comprising determining power supply capability to be presented to the external device, based on a state of the information processing apparatus, presenting the power supply capability determined by said determining to the external device, supplying power to the external device, based on a request from the external device as to the power supply capability presented by said presenting, and changing, in a case where the state of the information processing apparatus has changed, the power supply capability to be presented to the external device, based on the changed state.

In a fifth aspect of the present invention, there is provided a method of controlling a printing apparatus that is capable of supplying power to an external device, comprising determining power supply capability to be presented to the external device, based on a state of the printing apparatus, presenting the power supply capability determined by said determining to the external device, supplying power to the external device, based on a request from the external device as to the power supply capability presented by said presenting, and changing, in a case where the state of the information processing apparatus has changed, the power supply capability to be presented to the external device, based on the changed state.

In a sixth aspect of the present invention, there is provided a method of controlling a printing apparatus that includes a printing unit, and is capable of supplying power to an external device, comprising supplying power to the external device, receiving a print instruction, reducing, in a case where the print instruction is received, power supplied to the external device, and executing, after reducing the power supplied to the external device, printing based on the print instruction.

In a seventh aspect of the present invention, there is provided a non-transitory computer-readable storage medium storing a computer-executable program for executing a method of controlling an information processing apparatus that is capable of supplying power to an external device, wherein the method comprises determining power supply capability to be presented to the external device, based on a state of the information processing apparatus, presenting the power supply capability determined by said determining to the external device, supplying power to the external device, based on a request from the external device as to the power supply capability presented by said presenting, and changing, in a case where the state of the information processing apparatus has changed, the power supply capability to be presented to the external device, based on the changed state.

In an eighth aspect of the present invention, there is provided a non-transitory computer-readable storage medium storing a computer-executable program for executing a method of controlling a printing apparatus that is capable of supplying power to an external device, wherein the method comprises determining power supply capability to be presented to the external device, based on a state of the printing apparatus, presenting the power supply capability determined by said determining to the external device, supplying power to the external device, based on a request from the external device as to the power supply capability presented by said presenting, and changing, in a case where the state of the printing apparatus has changed, the power supply capability to be presented to the external device, based on the changed state.

In a ninth aspect of the present invention, there is provided a non-transitory computer-readable storage medium storing a computer-executable program for executing a method of controlling a printing apparatus that includes a printing unit, and is capable of supplying power to an external device, wherein the method comprises supplying power to the external device, receiving a print instruction, reducing, in a case where the print instruction is received, power supplied to the external device, and executing, after reducing the power supplied to the external device, printing based on the print instruction.

According to the present invention, when the apparatus state has changed, power is supplied to an external device on condition that combinations of supply voltage values and supply current values of power that can be supplied to the external device include a combination of respective values of supply voltage and supply current demanded by the external device, and hence it is possible to achieve both power supply to the external device and information processing.

Further features of the present invention will become apparent from the following description of exemplary embodiments (with reference to the attached drawings).

BRIEF DESCRIPTION OF THE DRAWINGS

FIG. 3 is a schematic constitution diagram of a power supply controller and a USB communication section appearing in FIG. 2.

FIG. 4A is a diagram showing a power supply capacity.

FIG. 4B is a diagram showing an apparatus state-specific power table.

FIG. 4C is a diagram showing a power supply capability list.

FIG. 5A is a diagram showing the maximum power supply capacity.

FIG. 5B is a diagram showing a power supply capability table.

FIG. 6 is a diagram showing a message list for power control notification defined by the USB PD standard.

DESCRIPTION OF THE EMBODIMENTS

The present invention will now be described in detail below with reference to the accompanying drawings showing embodiments thereof.

Figure 1:
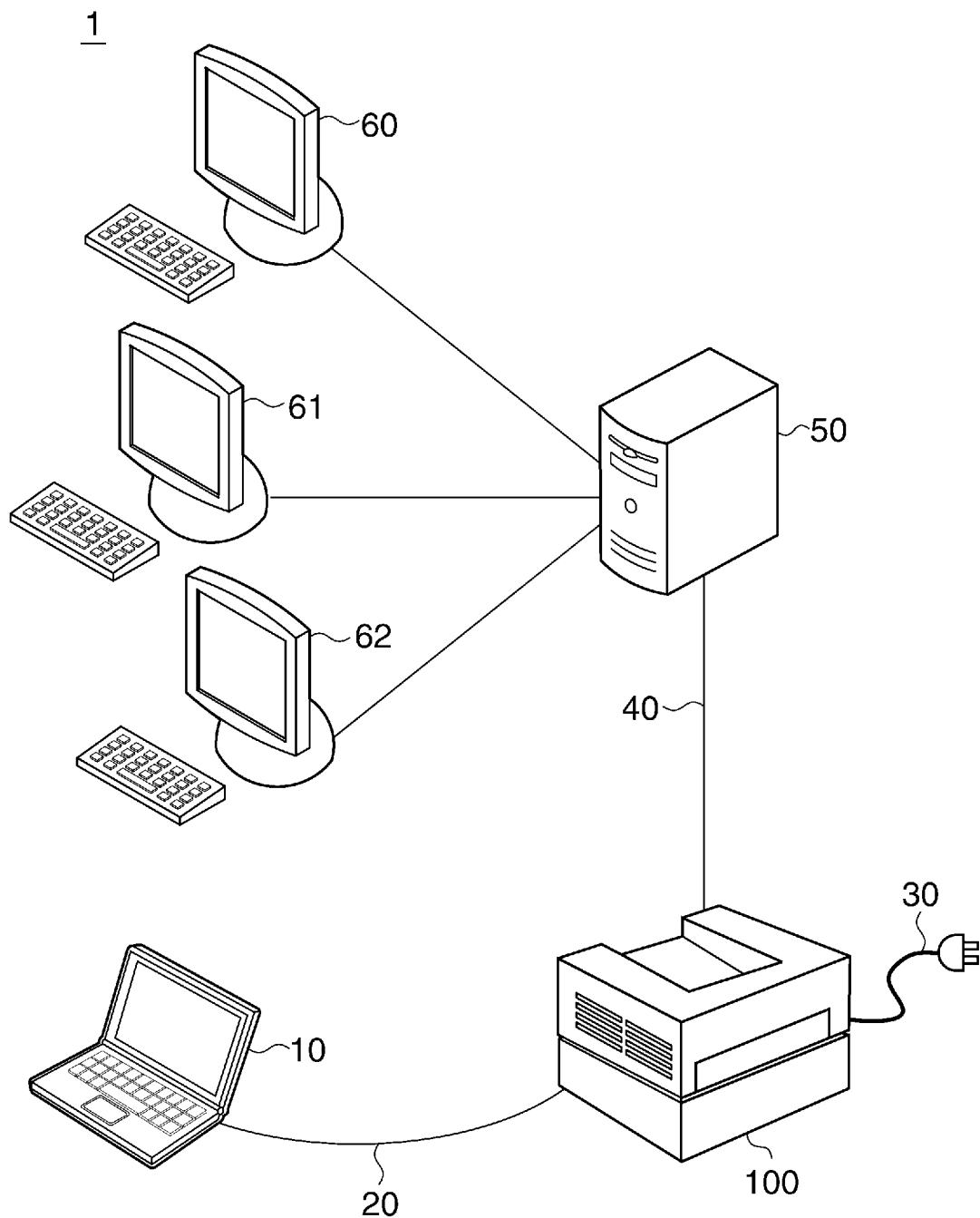
FIG. 1 is a schematic constitution diagram of an image processing system including an image processing apparatus according to an embodiment of the present invention.

FIG. 1 is a schematic constitution diagram of an image processing system 1 including an image processing apparatus 100 according to an embodiment of the present invention. In the present embodiment, the image processing apparatus is employed as an example of an information processing apparatus.

Referring to FIG. 1, the image processing system 1 is comprised of the image processing apparatus 100, a peripheral device 10, a network server 50, and network terminals 60, 61, and 62.

The image processing apparatus 100 is connected to the peripheral device 10 which is an external device by a USB cable 20. The image processing apparatus 100 has power supplied by a power cable 30, and supplies power to the peripheral device 10 using the USB cable 20.

Further, the image processing apparatus 100 is connected to the network server 50 via a network 40. The network server 50 is connected to the network terminals 60, 61, and 62, and is capable of communicating with the image processing apparatus 100.

For example, the image processing apparatus 100 executes interpreter processing and rendering processing on PDL data received from one of the network terminals 60, 61, and 62 via the network 40, and prints the obtained image data on a recording sheet.

Figure 2:
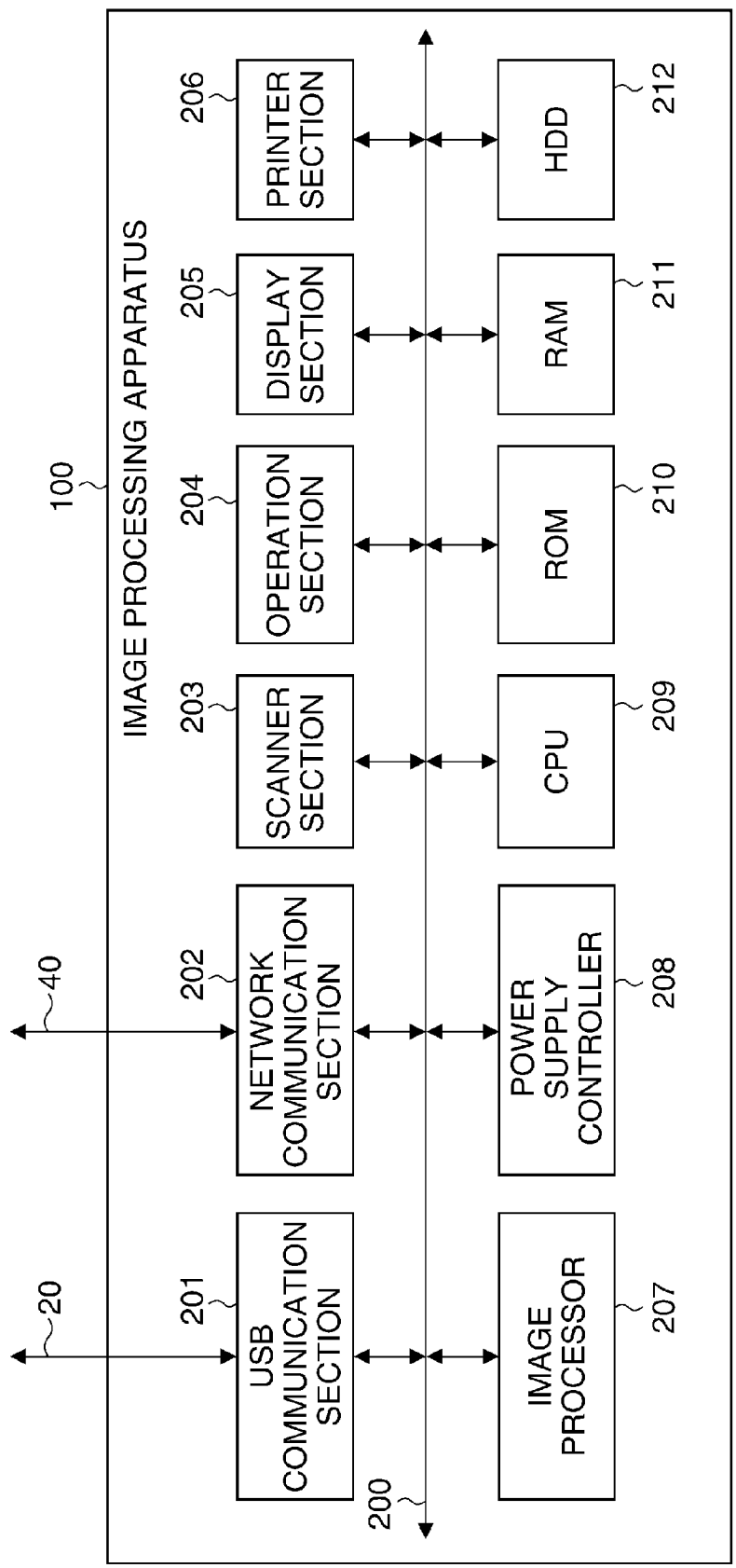
FIG. 2 is a schematic constitution diagram of the image processing apparatus appearing in FIG. 1.

FIG. 2 is a schematic constitution diagram of the image processing apparatus 100 appearing in FIG. 1.

Referring to FIG. 2, the image processing apparatus 100 is comprised of a USB communication section 201, a network communication section 202, a scanner section 203, an operation section 204, a display section 205, a printer section 206, an image processor 207, a power supply controller 208, a CPU 209, a ROM 210, a RAM 211, and an HDD 212, which are connected to each other via an internal bus 200.

The CPU 209 controls the overall operation of the image processing apparatus 100. The ROM 210 which is a storage section is a nonvolatile storage device storing programs describing details of control for image data handling and image processing to be performed by the image processing apparatus 100.

The RAM 211 is a volatile storage device, which is used as a work memory for temporarily storing various data when the CPU 209 executes programs, and as a communication buffer for temporarily storing data for transmission and data having being received.

The HDD 212 is a nonvolatile storage device that stores programs describing details of control performed by the image processing apparatus 100 and image data. Processes illustrated in flowcharts, referred to hereinafter, are performed by the CPU 209 that loads programs therefor stored in the ROM 210 or the HDD 212 into the RAM 211.

The USB communication section 201 performs data communication with the peripheral device 10 and power supply to the same via the USB cable 20.

The network communication section 202 performs data communication via the network 40 and a telephone line. More specifically, the network communication section 202 performs data communication via the network 40 and FAX communication via the public telephone line, with the network terminals 60, 61, and 62.

When scanning the whole original using the contact-type image sensor conveyed by a reading drive section, the scanner section 203 controls, using a reading light controller, not shown, lighting of an LED disposed in a contact-type image sensor, not shown. Simultaneously, the scanner section 203 optically reads the original image using a photo sensor, not shown, disposed in the contact-type image sensor, and converts the read image to image data representative of the original image.

The operation section 204 includes a user interface, not shown, such as operation keys, from which operation information on processing to be performed by the image processing apparatus 100 is input by a user. The display section 205 is implemented e.g. by a liquid crystal display, and displays setting information on processing to be executed by the image processing apparatus 100 and a result of the processing. The printer section 206 prints an image represented by the image data on a recording sheet at a predetermined output resolution.

The image processor 207 performs image processing on image data, such as scan image processing, print image processing, and communication image processing. More specifically, the image processor 207 performs image processing adapted to scan device characteristics, such as shading correction, gamma correction, binarization processing, halftone processing, and color space conversion from RGB to CMYK, on image data received from the scanner section 203.

Further, the image processor 207 performs image processing adapted to printer device characteristics, such as resolution conversion, smoothing, and density correction, on image data to be printed.

Further, the image processor 207 performs image processing adapted to communication device characteristics, such as resolution conversion and color space conversion, on image data to be transmitted and received via the network communication section 202.

The power supply controller 208 controls power supply to the processing sections of the image processing apparatus 100 and the peripheral device 10, based on power supplied via the power cable 30 appearing in FIG. 1, according to the state of the image processing apparatus 100.

FIG. 3 is a schematic constitution diagram of the power supply controller 208 and the USB communication section 201, appearing in FIG. 2.

Referring to FIG. 3, each thick line represents a power supply line, and each thin line represents an information communication line. A Vbus, referred to hereinafter, functions as both of the power supply line and the information communication line.

The USB communication section 201 includes a USB port 2011 and a cable detection section 2012. The USB port 2011 is a port for connecting the USB cable 20. The cable detection section 2012 detects connection of the USB cable 20 to the USB port 2011.

In the present embodiment, the cable detection section 2012 detects cable connection by determining whether or not impedance between a connector shield and a GND is not more than a resistance value specified by the USB PD standard.

The USB cable 20 is comprised of USB data lines for communicating information and USB bus lines for supplying power.

The USB data lines are formed by D+ and D− lines. High-speed communication can be performed in a state where the D+ line is high, and the D− line is low, and low-speed communication can be performed in a state where the D+ line is low, and the D− line is high. When both of the D+ and D− lines are how, it is considered that the USB cable is not connected.

The USB bus lines are formed by the Vbus and ground (GND), and the USB PD standard specifies a negotiation method using the Vbus.

When a device and a cable which are not compliant with the USB PD standard are used, 2.5 W of 5 V and 500 mA (USB 2.0), or 4.5 W of 5 V and 900 mA (USB 3.0) is supplied as a standard power.

On the other hand, when a device and a cable which are compliant with the USB PD standard are used, any of power of 12 V at 3 A and power of 12 V at 5 A, further, power of 20 V at 3 A or 100 W of 20 V at 5 A (maximum) can be supplied, as required.

The power supply controller 208 includes a power supply 2081, a supply power-switching section 2082, and a power line communication section 2083.

The power supply 2081 supplies power to the components of the image processing apparatus 100, and is capable of supplying power to the supply power-switching section 2082 at one of the voltages of 20 V, 12 V, and 5 V.

The supply power-switching section 2082 outputs one selected from the above-mentioned three voltages, which is supplied from the power supply 2081, to the Vbus according to an instruction from the CPU 209. Further, the power line communication section 2083 performs communication concerning power supply with the peripheral device 10 using the Vbus.

FIGS. 4A to 4C are diagrams showing a power supply capacity, an apparatus state-specific power table, and a power supply capability list, respectively.

FIG. 4A is the diagram showing the power supply capacity, denoted by reference numeral 300, of the power supply of the power supply controller 208. The power supply capacity 300 is power supply capacity information, which is stored in the ROM 210. As shown in FIG. 4A, the power supply capacity of the power supply of the power supply controller 208 is 1300 W in the present embodiment.

FIG. 4B is the diagram showing the apparatus state-specific power table, denoted by reference numeral 310, indicating a power consumption specific to each of states of the image processing apparatus 100. The apparatus state-specific power table 310 is stored in the ROM 210. For example, when an apparatus state, i.e. a state of the image processing apparatus 100, is printing, the power consumption is 1268 W. Since the power supply capacity is 1300 W, the power supply capacity of 32 W is obtained as the remaining power supply capacity in the case where the apparatus state is printing.

As shown in the apparatus states, the image processing apparatus 100 performs information processing, including copy and standby, in each apparatus state, and the power consumption is different between the apparatus states.

FIG. 4C is the diagram showing the power supply capability list, denoted by reference numeral 320, which is power supply capability information indicative of combinations of supply voltage, supply current, and supply power, which can be supplied by the image processing apparatus 100 using the Vbus. The power supply capability list 320 is stored in the ROM 210.

For example, the current supplied when the supply voltage is 20 V is 5.0 A or 3.0 A, and the power supplied in this case is 100 W or 60 W.

Further, since the remaining power supply capacity in the case where the apparatus state is printing is 32 W, a voltage, a current, and a power, indicated in each of the fourth and following combinations appearing in FIG. 4C, can be supplied during printing. Therefore, in FIG. 4C, in particular, reference numeral 322 indicates a printing-state power supply capability group of the above-mentioned voltage and current, and reference numeral 321 indicates a printing-time suppliable power group of the above-mentioned power corresponding thereto.

In the present embodiment, the above-mentioned apparatus states include the standby state, a sleep state, the operating state for performing the print operation, the scan operation, and so on, and the error state, such as a paper-out condition and a toner-out condition.

The term "change in the apparatus state" means a shift from each of the above-mentioned states to another state. For example, when a print job, a scan job, or the like is received, or when the paper-out condition, the toner-out condition, or the like is detected, the apparatus state is shifted from the current state to another state. Further, in the present embodiment, a shift to the standby state after the apparatus is powered on is also included in the changes in the apparatus state.

FIGS. 5A and 5B are diagrams showing the maximum power supply capacity and a power supply capability table.

FIG. 5A is the diagram showing the maximum power supply capacity in printing, denoted by reference numeral 400, which is calculated by the CPU 209 appearing in FIG. 2. The maximum power supply capacity 400 is stored in the RAM 211.

The maximum power supply capacity indicates an amount of power which can be supplied from the image processing apparatus 100 to the peripheral device 10.

As mentioned hereinabove, the remaining power supply capacity in the case where the apparatus state is printing is 32 W, and hence in this case, the maximum power supply capacity is 32 W.

The CPU 209 thus calculates the maximum power supply capacity by subtracting a value of power consumption during printing from a value of the power supply capacity, and this is not limited to during printing.

FIG. 5B is the diagram showing the power supply capability table, denoted by reference numeral 410, which stores combinations of values of supply voltage and supply current during printing, and is generated from the power supply capability list 320 by the CPU 209 appearing in FIG. 2. The power supply capability table 410 is stored in the RAM 211.

When creating the power supply capability table 410, first, out of values of the suppliable power on the power supply capability list 320 stored in the ROM 210, the printing-time suppliable power group 321 indicating values of the suppliable power not larger than the calculated maximum power supply capacity 400 are determined.

For example, since the maximum power supply capacity 400 in printing is 32 [W], the printing-time suppliable power group 321 is formed of combinations when the power supply is 18, 10, 7.5, 4.5, and 2.5 [W], as shown in FIG. 4C.

Next, a combination of supply voltage and supply current corresponding to each suppliable power of the printing-time suppliable power group 321 is extracted from the power supply capability list 320, and the power supply capability table 410 for the current state (printing in the case of FIGS. 5A and 5B) is created and stored in the RAM 211.

Therefore, the power supply capability table 410 is obtained by extraction from the printing-state power supply capability group 322 shown in FIG. 4C. As described above, in the present embodiment, the suppliable power information is created by extracting combinations of values of supply voltage and supply current each forming suppliable power not higher than an amount of power obtained by subtracting the power consumption in the changed apparatus state from the power supply capacity 300.

FIG. 6 is a diagram showing a message list for power control notification defined by the USB PD standard.

The list shown in FIG. 6 enumerates messages for sending respective power control notifications, a direction indicative of a transmission/reception destination of each message, and contents of the message.

A power supply capability notification (Capability) is a message for presenting values of suppliable power from the image processing apparatus 100 to the peripheral device 10, in the form of a plurality of combinations of voltage and current values.

A power supply request notification (Request) is a message for presenting a requested combination of voltage and current values selected from the combinations of voltage and current values presented by the power supply capability notification, from the peripheral device 10 to the image processing apparatus 100.

Further, the power supply request notification includes a mismatch flag indicative of capability mismatch. The mismatch flag is a flag indicating whether or not a power supply request suffers from a capability mismatch with respect to the combinations in the power supply capability notification, by ON or OFF. This flag is set to ON if a capability mismatch occurs, and is set to OFF if a capability match occurs.

The power supply request notification further includes a GiveBack attribute flag indicative of whether or not power to be supplied can be changed after the start of power supply. The GiveBack attribute flag is a flag indicative of whether or not power supplied from the image processing apparatus 100 to the peripheral device 10 can be changed when the power supply is desired to be limited after the start of power supply, by ON or OFF. This flag is set to ON if power to be supplied can be changed, and is set to OFF if power to be supplied cannot be changed.

A power supply acceptance (Accept) is a message for notifying from the image processing apparatus 100 to the peripheral device 10 that power supply according to the power supply request notification can be executed.

A power supply preparation completion (PS_RDY) is a message for notifying from the image processing apparatus 100 to the peripheral device 10 that power supply according to the power supply request notification is ready to be started.

A power supply rejection (Reject) is a message for notifying from the image processing apparatus 100 to the peripheral device 10 that power supply according to the power supply request notification cannot be executed.

A power supply minimization request (GoToMin) is a message indicating a request from the image processing apparatus 100 to the peripheral device 10 that supply power is to be changed so as to minimize power supply according to the power supply request notification.

A power supply stopping request (HardReset) is a message for notifying from the peripheral device 10 to the image processing apparatus 100 that power supply according to the power supply request notification is requested to be stopped, and is issued e.g. when charging is completed.

Figure 7:
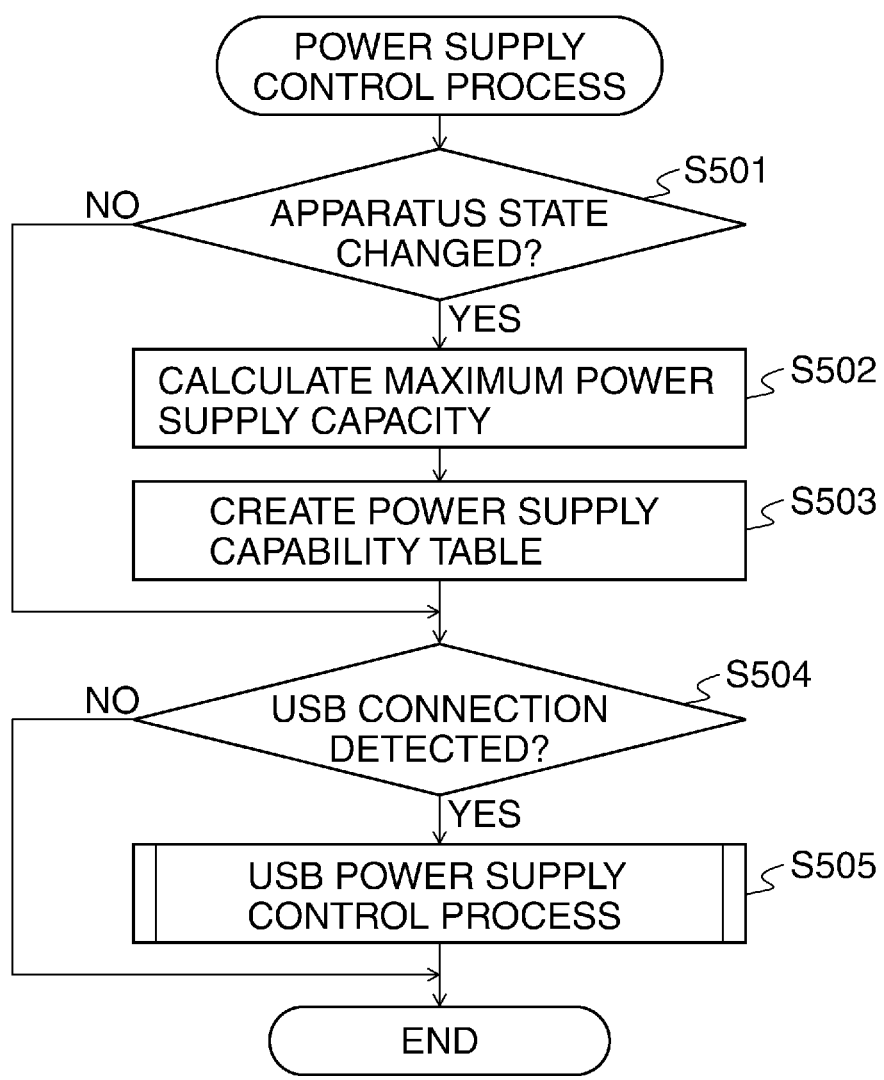
FIG. 7 is a flowchart of a power supply control process performed by a CPU appearing in FIG. 2.

FIG. 7 is a flowchart of a power supply control process performed by the CPU 209 appearing in FIG. 2.

Referring to FIG. 7, if the apparatus state has changed (YES to a step S501), the CPU 209 calculates the maximum power supply capacity in the changed apparatus state, described with reference to FIG. 5A (step S502).

Next, the CPU 209 creates the power supply capability table 410 shown in FIG. 5B (step S503). The step S503 corresponds to the operation of a creation unit configured to create suppliable power information indicative of combinations of supply voltage and supply current, which can be supplied from the image processing apparatus 100 to the peripheral device 10 when the apparatus state has changed.

Then, the CPU 209 determines whether or not USB connection for connecting the USB cable 20 to the USB connector is detected by the USB communication section 201 (step S504). Note that if it is not determined in the step S501 that the apparatus state has changed (NO to the step S501), the process directly proceeds to the step S504.

If it is determined in the step S504 that USB connection is not detected (NO to the step S504), the present process is immediately terminated.

On the other hand, if it is determined in the step S504 that USB connection is detected (YES to the step S504), the CPU 209 performs, using the power supply controller 208, a USB power supply control process for the peripheral device 10 connected by the USB cable 20 (step S505), followed by terminating the present process.

Figure 8:
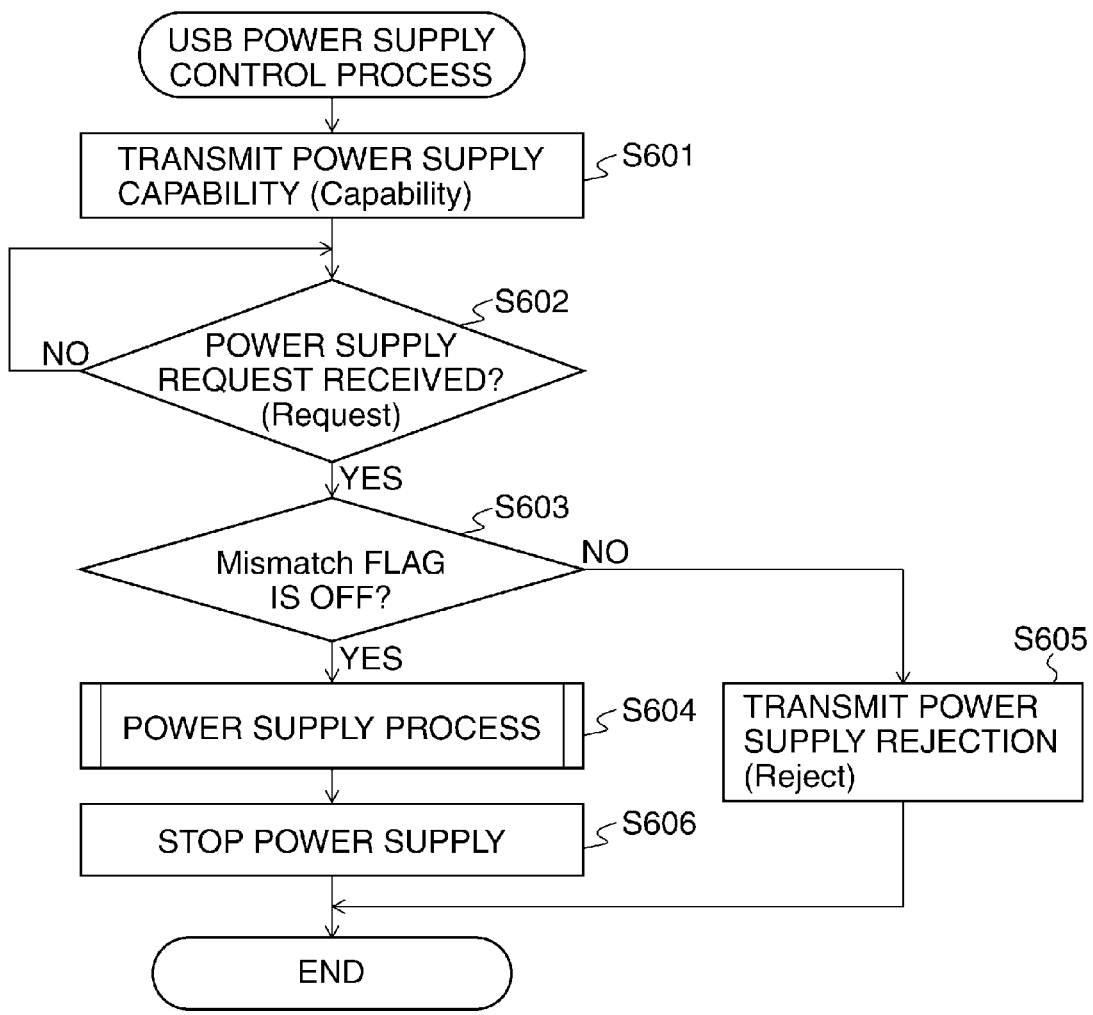
FIG. 8 is a flowchart of a USB power supply control process executed in a step of the power supply control process in FIG. 7.

FIG. 8 is a flowchart of the USB power supply control process performed in the step S505 in the power supply control process in FIG. 7.

Referring to FIG. 8, the CPU 209 sends the power supply capability notification (see FIG. 6) based on the power supply capability table 410 stored in the RAM 211 to the peripheral device 10 via the Vbus (step S601).

Then, when the USB communication section 201 receives the power supply request notification (see FIG. 6) from the peripheral device 10 (YES to a step S602), the CPU 209 determines whether or not the mismatch flag is OFF (step S603).

If it is determined in the step S603 that the mismatch flag is ON (NO to the step S603), this indicates that there is no combination of voltage and current to be requested by the peripheral device 10 in the power supply capability presented by the image processing apparatus 100. Accordingly, the CPU 209 sends the power supply rejection notification (see FIG. 6) to the peripheral device 100 via the Vbus (step S605), followed by terminating the present process.

On the other hand, if it is determined in the step S603 that the mismatch flag is OFF (YES to the step S603), the CPU 209 performs a power supply process for supplying power (step S604). As the power supply process, there is performed one of three types which are referred to as the power supply processes A, B, and C in the following description.

Then, to terminate the power supply process, the CPU 209 instructs the power supply controller 208 to stop outputting of power to the Vbus to thereby stop power supply (step S606), followed by terminating the present process.

Hereinafter, the power supply processes A, B, and C, performed in the step S604 will be described.

Figure 9:
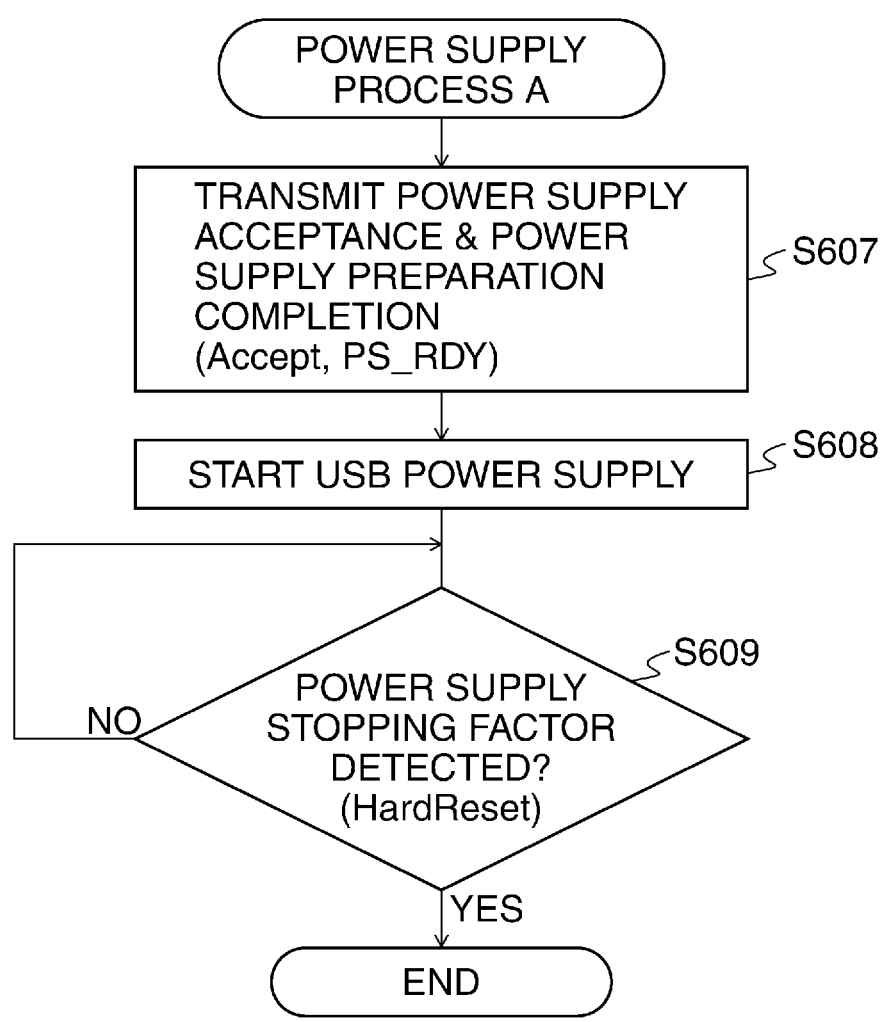
FIG. 9 is a flowchart of a power supply process A executed in a step of the USB power supply control process in FIG. 8.

FIG. 9 is a flowchart of the power supply process A.

Referring to FIG. 9, the CPU 209 transmits the power supply acceptance notification (see FIG. 6) and the power supply preparation completion notification (see FIG. 6) to the peripheral device 10 via the Vbus (step S607).

Then, the CPU 209 sets the power supply controller 208 such that a voltage indicated in the power supply request notification received in the step S602 is output to the Vbus, and starts USB power supply (step S608). The steps S607 and S608 correspond to the operation of a power supply unit configured to supply power to the peripheral device 10 at a supply voltage and a supply current requested by the peripheral device 10 when a combination of supply voltage and supply current requested by the peripheral device 10 exists in the combinations indicated in the suppliable power information.

After USB power supply is started, the CPU 209 determines whether or not a power supply stopping factor is detected (step 609). Examples of the power supply stopping factor include reception of a power supply stopping request (see FIG. 6) from the peripheral device 10, and removal of the USB cable 20. If a power supply stopping factor is detected (YES to the step S609), the present process is terminated.

According to the above-described power supply control process, the USB power supply control process, and the power supply process A, power which can be supplied according to each state of the image processing apparatus 100 is notified to a peripheral device connected according to the USB PD standard, whereby it is possible to achieve both image processing and power supply with a limited power supply capacity.

Next, a description will be given of the power supply process B for performing the USB power supply control, in which a case is considered where the state of the image processing apparatus 100 has changed after the start of power supply.

The power supply process B will be described, by taking a case as an example, where a print job is executed after USB power supply has been started for the peripheral device 10 connected to the image processing apparatus 100 via the USB cable 20.

Although the above-mentioned print job is e.g. a print job performed upon receipt of a print instruction via the network 40, or a copy job performed according to an instruction input from the operation section 204, it is assumed in the following power supply process B that the print job is performed upon receipt of a print instruction.

Figure 10:
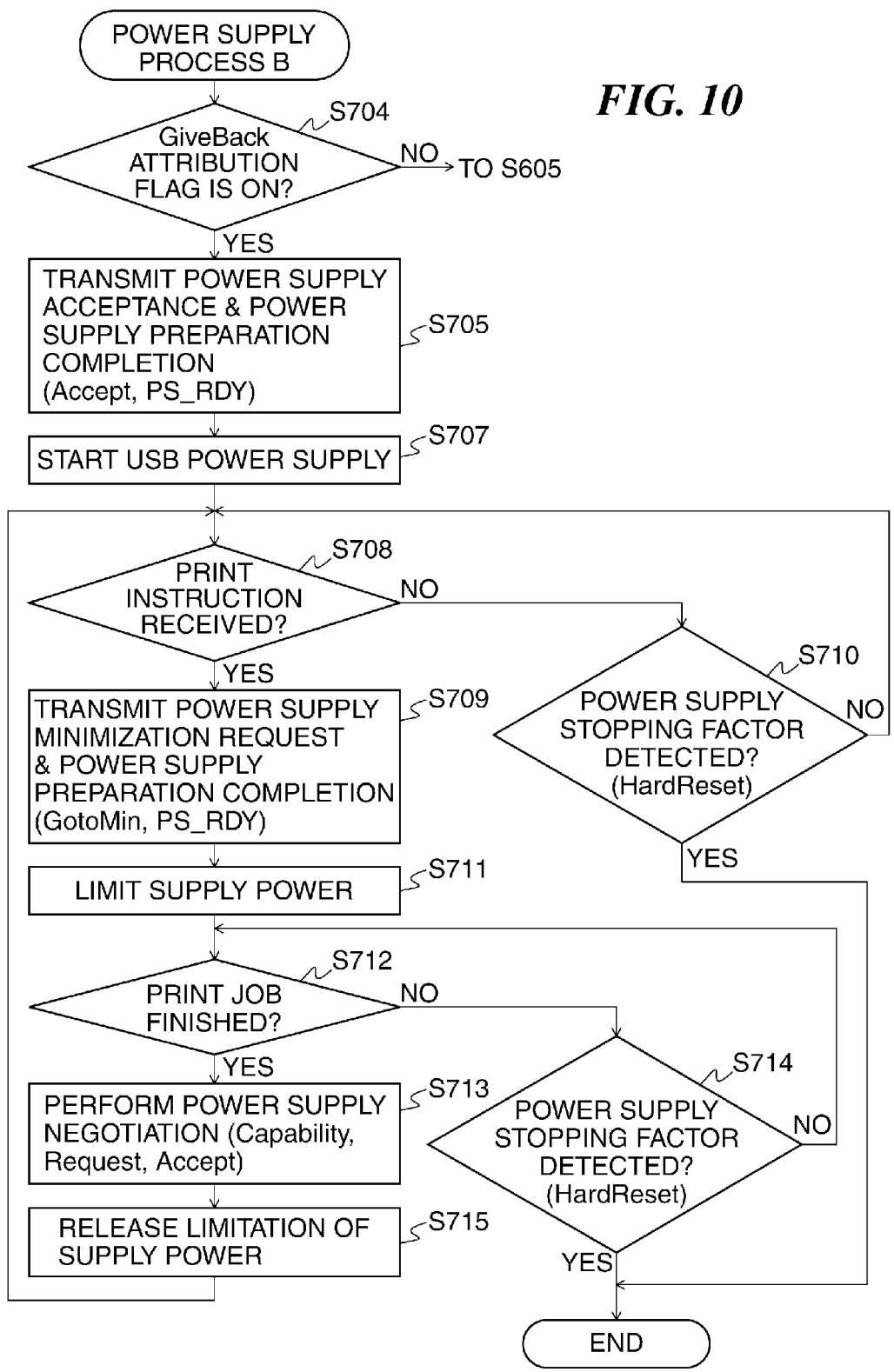
FIG. 10 is a flowchart of a power supply process B executed in the step of the USB power supply control process in FIG. 8.

FIG. 10 is a flowchart of the power supply process B.

Referring to FIG. 10, the CPU 209 determines whether or not the GiveBack attribute flag (see FIG. 6) included in the power supply request notification is ON (step S704).

If it is determined in the step S704 that the GiveBack attribute flag is OFF (NO to the step S704), the process proceeds to the step S605 in FIG. 8.

On the other hand, if it is determined in the step S704 that the GiveBack attribute flag is ON (YES to the step S704), the CPU 209 transmits the power supply acceptance notification and the power supply preparation completion notification to the peripheral device 10 via the Vbus (step S705).

Then, the CPU 209 sets the power supply controller 208 such that a voltage indicated in the power supply request notification received in the step S602 is output to the Vbus, and starts USB power supply (step S707).

Then, the CPU 209 determines whether or not a print instruction is received (step S708). If it is determined in the step S708 that a print instruction is not received (NO to the step S708), the CPU 209 determines whether or not a power supply stopping factor is detected (step S710).

If it is determined in the step S710 that a power supply stopping factor is detected (YES to the step S710), the present process is immediately terminated. On the other hand, if it is determined in the step S710 that a power supply stopping factor is not detected (NO to the step S710), the process returns to the step S708.

Referring again to the step S708, if it is determined in the step S708 that a print instruction is received (YES to the step S708), the CPU 209 transmits the power supply minimization request (see FIG. 6) and the power supply preparation completion notification to the peripheral device 10 to which power is being supplied via the Vbus (step S709).

Then, the CPU 209 causes the power supply controller 208 to limit the power supply (step S711). In this step S711, the control for reducing power supplied to the peripheral device 10 via the USB communication section 201 to limit the same is performed. Thus, in the present embodiment, power to be supplied can be changed during power supply to the peripheral device 10, and when the apparatus state has changed during power supply, power supplied to the peripheral device 10 is changed.

Then, the CPU 209 determines whether or not the print job is finished (step S712). If it is determined in the step S712 that the print job is finished (YES to the step S712), the CPU 209 performs power supply negotiation again with the peripheral device 10 to which power is being supplied (step S713). This power supply negotiation is performed using the messages of the power supply capability notification, the power supply request notification, the power supply acceptance notification, and the power supply preparation completion notification.

When the power supply negotiation is terminated, the CPU 209 causes the power supply controller 208 to release the limitation of power supply (step S715), and returns to the step S708. In this step S715, there is performed control for releasing the limitation of power supply to the peripheral device 10 via the USB communication section 201 and increasing the amount of power to the original amount. As described above, in the present embodiment, in the case where power supply to the peripheral device 10 is changed due to a change in the apparatus state and thereafter the apparatus state is recovered to a state before the change, the power supply to the peripheral device 10 is changed to the power supply performed in the apparatus state before the change.

Referring back to the step S712, if it is determined in the step S712 that the print job is not finished (NO to the step S712), the CPU 209 determines whether or not a power supply stopping factor is detected (step S714).

If it is determined in the step S714 that a power supply stopping factor is detected (YES to the step S714), the present process is immediately terminated. On the other hand, if it is determined in the step S714 that no power supply stopping factor is detected (NO to the step S714), the present process returns to the step S712.

Figure 11A:
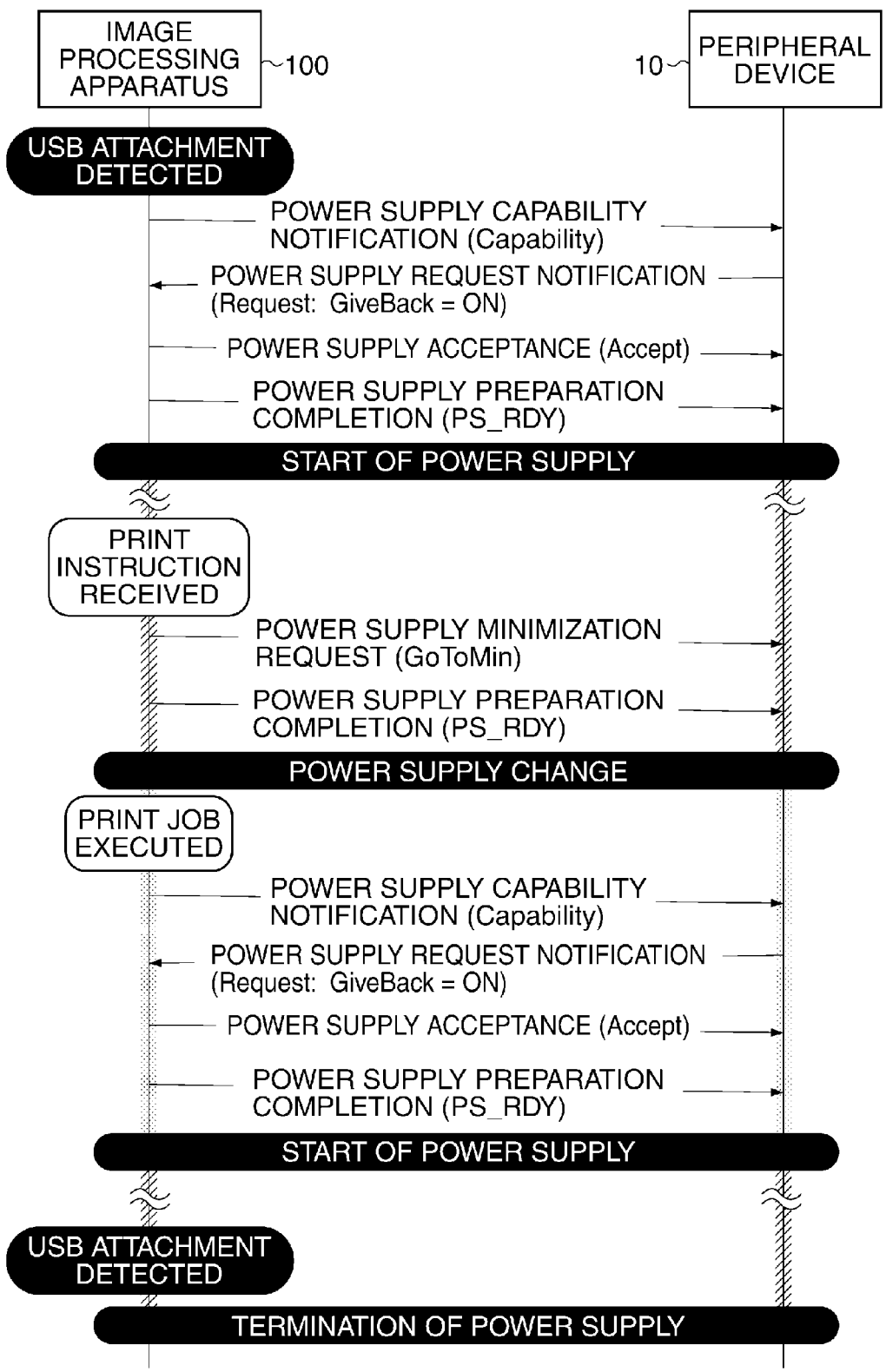
FIGS. 11A and 11B are sequence diagrams showing power supply negotiation in the power supply control process including the power supply process B.
Figure 11B:
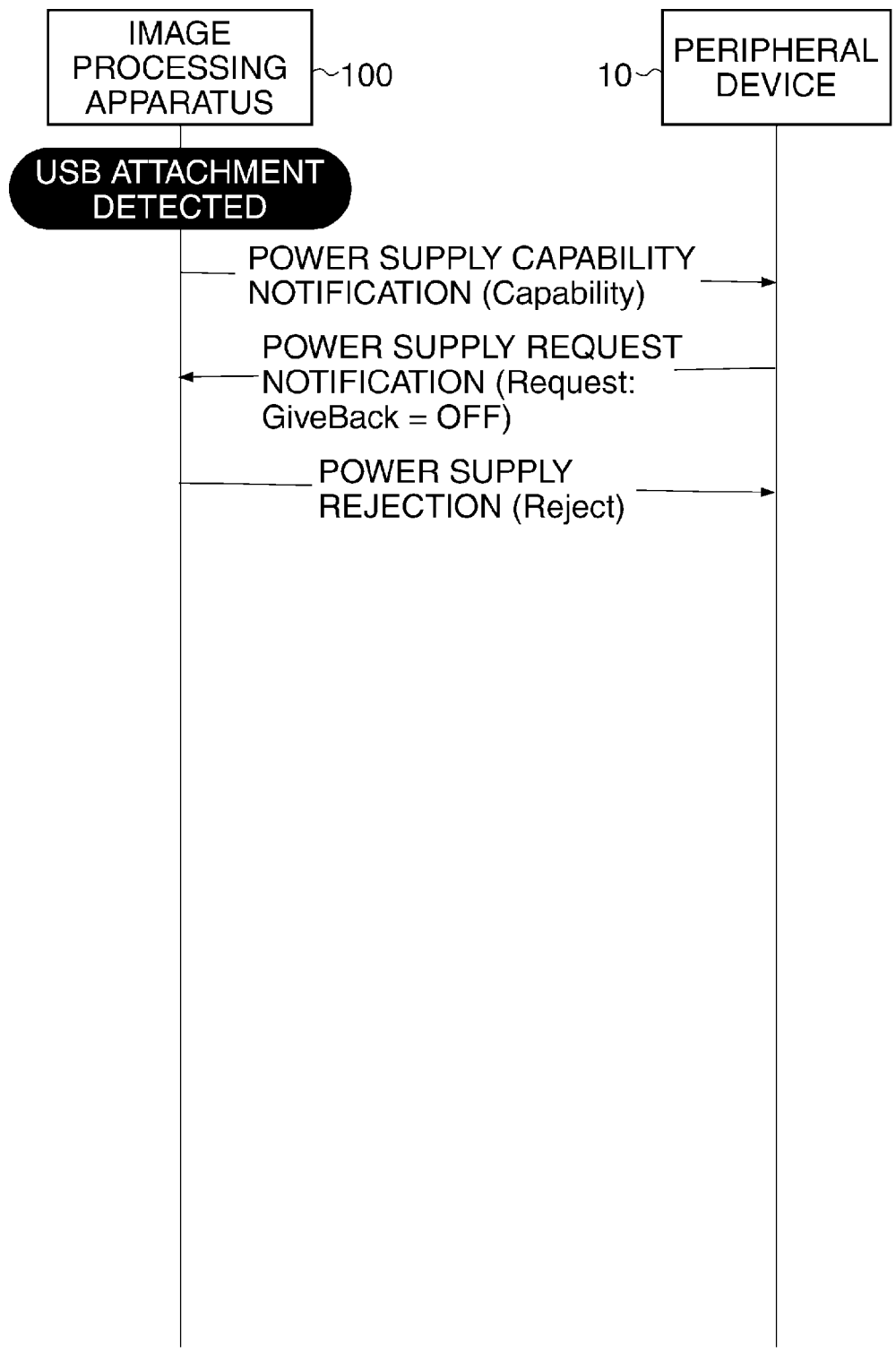

FIGS. 11A and 11B are sequence diagrams showing power supply negotiation in the power supply control process including the power supply process B.

FIG. 11A shows an example of power supply negotiation based on the USB PD standard in a case where a print job is executed during USB power supply and the GiveBack attribute flag is ON in the step S704.

As shown in FIG. 11A, the image processing apparatus 100 starts power supply after confirming that power can be changed before the start of power supply, and when a print job is received, performs control such that the amount of power supplied by USB power supply is limited, to thereby achieve both printing and USB power supply.

FIG. 11B shows an example of power supply negotiation based on the USB PD standard in a case where a print job is executed during USB power supply and the GiveBack attribute flag is OFF in the step S704.

As shown in FIG. 11B, the image processing apparatus 100 rejects power supply if it is impossible to confirm that power can be changed before the start of power supply to thereby prevent USB power supply from impeding execution of the print job.

According to the above-described power supply control process, the USB power supply control process, and the power supply process B, power supply to a peripheral device connected according to the USB PD standard is controlled such that the power supply is changed when the state of the image processing apparatus has changed, whereby it is possible to achieve both image processing and power supply with a limited power supply capacity.

Next, a description will be given of the power supply process C for performing the USB power supply control, in which a case is considered where the state of the image processing apparatus 100 has changed after the start of power supply.

Similarly to the power supply process B, the power supply process C will be described taking a case, as an example, where a print job is performed after USB power supply has been started for the peripheral device 10 connected to the image processing apparatus 100 via the USB cable 20, and it is also assumed in the power supply process C that the print job is performed upon receipt of a print instruction.

The power supply process C differs from the power supply process B in that four conditions set in advance are used. These conditions are used when power to be supplied exceeds the power supply capacity when a print instruction is received and a print job is executed.

First, condition 1 is that the battery of the peripheral device 10 has sufficient remaining capacity. This can be confirmed by performing data communication with the peripheral device 10 via connection using the USB cable 20.

Condition 2 is that a change of the power supply state is permitted by the peripheral device 10 or a user of the peripheral device 10. This can also be confirmed by performing data communication with the peripheral device 10 via connection using the USB cable 20.

Condition 3 is that the change of the power supply state is permitted by a user of the image processing apparatus 100. This can be confirmed by displaying a message to the user of the image processing apparatus 100 on the display section 205, for confirmation of whether or not to permit the power supply state to be changed, and obtaining a result of the user's operation on the operation section 204.

Condition 4 is that the peripheral device 10 is in the low-power state. This can be confirmed based on a power consumption actually supplied from the USB communication section 201 to the peripheral device 10. If the power consumption is low, the peripheral device 10 is in the low-power state.

Figure 12:
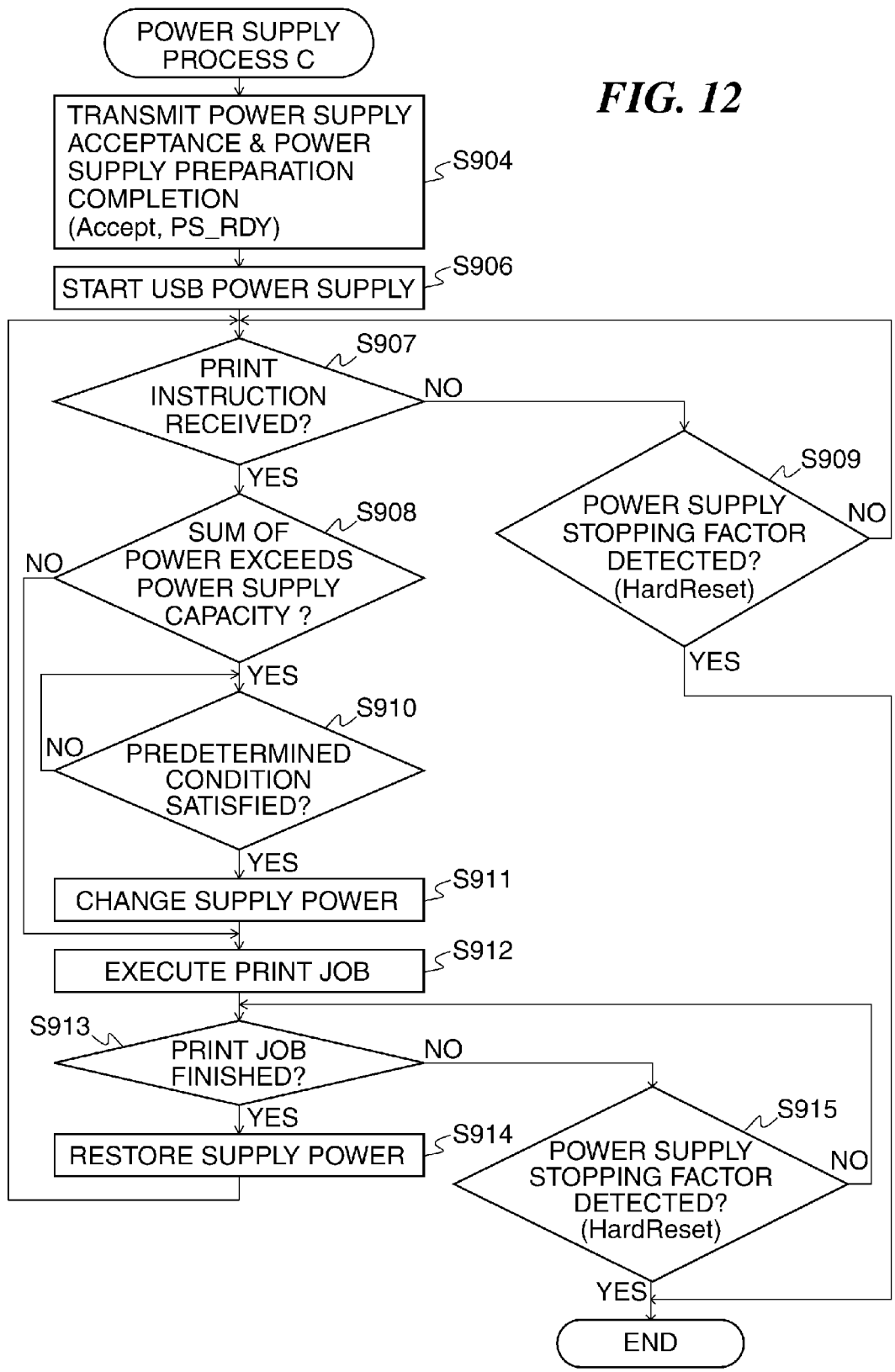
FIG. 12 is a flowchart of a power supply process C executed in the step of the USB power supply control process in FIG. 8.

FIG. 12 is a flowchart of the power supply process C.

Referring to FIG. 12, the CPU 209 transmits power supply acceptance notification and the power supply preparation completion notification to the peripheral device 10 via the Vbus (step S904).

Then, the CPU 209 sets the power supply controller 208 such that a voltage indicated in the power supply request notification received in the step S602 in FIG. 8 is to be output to the Vbus, and starts USB power supply (step S906).

Then, the CPU 209 determines whether or not a print instruction is received (step S907). If it is determined in the step S907 that a print instruction is not received (NO to the step S907), the CPU 209 determines whether or not a power supply stopping factor is detected (step S909).

If it is determined in the step S909 that a power supply stopping factor is detected (YES to the step S909), the present process is immediately terminated. On the other hand, if it is determined in the step S909 that no power supply stopping factor is detected (NO to the step S909), the process returns to the step S907.

Referring again to the step S907, if it is determined in the step S907 that a print instruction is received (YES to the step S907), the CPU 209 determines whether or not the sum of power required for image processing and power required for power supply exceeds the power supply capacity (step S908).

If it is determined in the step S908 that the sum does not exceed the power supply capacity (NO to the step S908), the process proceeds to a step S912.

On the other hand, if it is determined in the step S908 that the sum exceeds the power supply capacity (YES to the step S908), the CPU 209 waits until a predetermined condition is satisfied (step S910). To satisfy the predetermined condition is to satisfy at least one of Conditions 1 to 4 described hereinabove.

If the predetermined condition is satisfied (YES to the step S910), the CPU 209 causes the power supply controller 208 to change power supply (step S911). In this step S911, there is performed control for reducing power supply to the peripheral device 10 via the USB communication section 201 to limit the same, or stopping the power supply.

Then, the CPU 209 causes the print job to be executed (step S912), and determines whether or not the print job is finished (step S913). If it is determined in the step S913 that the print job is finished (YES to the step S913), the CPU 209 restores power supply to the peripheral device 10 (step S914), and returns to the step S907.

In the step S914, there is performed control for releasing limitation of power supply to the peripheral device 10 via the USB communication section 201 and increasing the amount of power to the original amount. If the answer to the question of the step S908 is negative (NO to the step S908), power supply is not changed, and hence the control for restoring power supply is not performed.

Referring again to the step S913, if it is determined in the step S913 that the print job is not finished (NO to the step S913), the CPU 209 determines whether or not a power supply stopping factor is detected (step S915).

If it is determined in the step S915 that a power supply stopping factor is detected (YES to the step S915), the present process is immediately terminated. On the other hand, if it is determined in the step S915 that no power supply stopping factor is detected (NO to the step S915), the process returns to the step S913.

As shown in the above-described steps S908, S910, and S911, in the present embodiment, power to be supplied can be changed during power supply to the peripheral device 10, and in a case where the apparatus state is to be changed during power supply to the peripheral device 10, if the sum of the amount of power supplied to the peripheral device 10 and the amount of power to be consumed by the apparatus state after the change exceeds the power supply capacity (YES to the step S908), after the predetermined condition is satisfied (YES to the step S910), power supplied to the peripheral device 10 is changed (step S911) and the apparatus state is changed (step S912).

According to the power supply control process, the USB power supply control process, and the power supply process C, described above, power to be supplied to a peripheral device connected according to the USB PD standard is controlled such that the power supply is changed in a case where the state of the image processing apparatus 100 is to be changed, whereby it is possible to achieve both image processing and power supply with a limited power supply capacity.

Further, a series of the USB power supply control, described by the power supply control process, the USB power supply control process, and the power supply processes A, B, and C, is repeatedly executed in the image processing apparatus 100, whereby the power supply capability table 410 is updated whenever the state of the image processing apparatus 100 has changed, and power supply suitable for the state can be achieved.

According to the present embodiment, power which can be supplied according to each state of the image processing apparatus is notified to a peripheral device connected according to the USB PD standard, whereby it is possible to achieve both image processing and power supply with a limited power supply capacity.

As described above, in the present embodiment, when the apparatus state has changed (YES to the step S501), power is supplied to the peripheral device 10 only in a case where a combination of supply voltage and supply current, which is requested by the peripheral device 10, exists in the combinations of supply voltage and supply current of power which can be supplied to the peripheral device 10 (step S608), and hence it is possible to achieve both power supply to the peripheral device 10 and information processing.

Although in the present embodiment, the image processing apparatus has been described as an example of the information processing apparatus, the present embodiment can be applied to operational equipment, such as a CPU, a MPU, and an ASIC, and a storage device, such as a ROM, a RAM, and an HDD, insofar as it has the basic configuration of the information processing apparatus, regardless of whether or not image processing is performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-053480 filed Mar. 17, 2014, which is hereby incorporated by reference herein in its entirety.

What is claimed is:

1. A printing apparatus that is capable of supplying power to an external device, comprising:
a storage device; and
a processor configured to execute computer executable instructions recorded on the storage device, the computer executable instructions including instructions, that when executed by the processor, cause the printing apparatus to:
determine power supply capability to be presented to the external device, based on a state of the printing apparatus, wherein the power supply capability indicates a plurality of combinations of voltage and current;
present the determined power supply capability to the external device; and
supply power to the external device, based on a combination selected among the plurality of combinations by the external device,
wherein in a case where the printing apparatus is in a sleep state, first power supply capability is determined to be presented to the external device,
in a case where the printing apparatus is in a printing state, second power supply capability is determined to be presented to the external device, and
the number of the combinations indicated by the first power supply capability and the number of the combinations indicated by the second power supply capability are different from each other.

2. The printing apparatus according to claim 1, wherein the number of the combinations indicated by the first power supply capability is larger than the number of the combinations indicated by the second power supply capability.

3. The printing apparatus according to claim 1, wherein the computer executable instructions further include instructions, that when executed by the processor, cause the printing apparatus to supply power to the external device via a USB cable.

4. A method of controlling a printing apparatus that is capable of supplying power to an external device, comprising:
determining power supply capability to be presented to the external device, based on a state of the printing apparatus, wherein the power supply capability indicates a plurality of combinations of voltage and current;
presenting the power supply capability determined by said determining to the external device;
supplying power to the external device, based on a combination selected among the plurality of combinations by the external device;
determining, in a case where the printing apparatus is in a sleep state, first power supply capability to be presented to the external device; and
determining, in a case where the printing apparatus is in a printing state, second power supply capability to be presented to the external device,
wherein the number of the combinations indicated by the first power supply capability and the number of the combinations indicated by the second power supply capability are different from each other.

5. A non-transitory computer-readable storage medium storing a computer-executable program for executing a method of controlling a printing apparatus that is capable of supplying power to an external device,
wherein the method comprises:
determining power supply capability to be presented to the external device, based on a state of the printing apparatus, wherein the power supply capability indicates a plurality of combinations of voltage and current;
presenting the power supply capability determined by said determining to the external device;
supplying power to the external device, based on a combination selected among the plurality of combinations by the external device;

determining, in a case where the printing apparatus is in a sleep state, first power supply capability to be presented to the external device; and determining, in a case where the printing apparatus is in a printing state, second power supply capability to be presented to the external device, wherein the number of the combinations indicated by the first power supply capability and the number of the combinations indicated by the second power supply capability are different from each other.

* * * * *